(12) United States Patent
Hall

(10) Patent No.: US 8,681,443 B2
(45) Date of Patent: *Mar. 25, 2014

(54) SHINGLE-WRITTEN MAGNETIC RECORDING (SMR) DEVICE WITH HYBRID E-REGION

(75) Inventor: David Robison Hall, Rochester, MN (US)

(73) Assignee: HGST Netherlands B.V., Amsterdam (NL)

(*) Notice: Subject to any disclaimer, the term of this patent is extended or adjusted under 35 U.S.C. 154(b) by 91 days.

This patent is subject to a terminal disclaimer.

(21) Appl. No.: 13/411,503

(22) Filed: Mar. 2, 2012

(65) Prior Publication Data

US 2012/0300325 A1    Nov. 29, 2012

Related U.S. Application Data

(60) Provisional application No. 61/489,174, filed on May 23, 2011.

(51) Int. Cl.
*G11B 5/09* (2006.01)
(52) U.S. Cl.
USPC .................................. 360/48; 360/55; 360/43
(58) Field of Classification Search
None
See application file for complete search history.

(56) References Cited

U.S. PATENT DOCUMENTS

| 6,185,063 | B1  | 2/2001  | Cameron |
| 6,378,037 | B1  | 4/2002  | Hall |
| 6,967,810 | B2  | 11/2005 | Kasiraj et al. |
| 7,603,530 | B1  | 10/2009 | Liikanen et al. |
| 7,965,465 | B2  | 6/2011  | Sanvido et al. |
| 8,271,801 | B2* | 9/2012  | Guyot ............................ 713/189 |
| 2005/0071537 | A1 | 3/2005 | New et al. |
| 2007/0183071 | A1 | 8/2007 | Uemura et al. |
| 2010/0205623 | A1 | 8/2010 | Molaro et al. |
| 2010/0232057 | A1 | 9/2010 | Sanvido et al. |
| 2011/0058277 | A1 | 3/2011 | de la Fuente et al. |

OTHER PUBLICATIONS

Yuval Cassuto, et al.; Indirection Systems for Shingled-Recording Disk Drives; 26th IEEE (MSST2010) Symposium on Massive Storage Systems and Technologies; May 7, 2010 http://storageconference.org/2010/Presentations/Research/15.Cassuto.pdf 44 pages.

Ikuya Tagawa, et al.; Minimization of erase-band in shingled PMR with asymmetric writer, Journal of Magnetism and Magnetic Materials; No vol. or page given; online Dec. 2, 2010 in ScienceDirect. 3 pages.

(Continued)

*Primary Examiner* — Muhammad N Edun
(74) *Attorney, Agent, or Firm* — G. Marlin Knight

(57) ABSTRACT

SMR disk drives with hybrid E-regions that include a non-volatile solid state memory E-region in addition to the magnetic media E-regions on disk are described. The memory E-region can be used in operations that will be referred as destaging and/or restaging to sequentialize sets of exception records to reduce the time and energy spent in executing seeks in the disk E-region. The ratio of the size of the solid state memory E-region to the total E-region capacity on the disks can be optimized for selected applications according to the invention using tradeoffs between performance and cost. For example, an embodiment with a memory E-region size that is 10% of the total disk E-region capacity achieves substantial performance enhancement over a disk-only E-region implementation and also results in smaller costs than would be required in a NAND-only memory E-region.

13 Claims, 6 Drawing Sheets

(56) References Cited

OTHER PUBLICATIONS

Ahmed Amer, et al.; Design Issues for a Shingled Write Disk System; 26th IEEE (MSST 2010) Symposium on Massive Storage Systems and Technologies: Research Track; May 7, 2010 http://storageconference.org/2010/Papers/MSST/Amer.pdf . 12 pages.

\* cited by examiner

SHINGLE-WRITTEN MAGNETIC RECORDING (SMR) DEVICE WITH HYBRID E-REGION

RELATED APPLICATIONS

This application is related to commonly assigned provision patent application filed on May 23, 2011 bearing serial number is 61/489,174, and the benefits of this provisional application are claimed under 35 U.S.C. 119(e).

A commonly assigned patent application filed on Jul. 18, 2011 bearing Ser. No. 13/135,953, which is hereby incorporated by reference, describes SMR drive embodiments with write-twice cache regions that are mentioned in the present application.

FIELD OF THE INVENTION

The invention relates to the field of data storage device architecture and more particularly to shingle-written magnetic recording (SMR) devices.

BACKGROUND

Conventional disk drives with magnetic media organize data in concentric tracks that are spaced apart. The concept of shingled writing is a form of perpendicular magnetic recording and has been described as a way of increasing the areal density of magnetic recording. In shingle-written magnetic recording (SMR) media a region (band) of adjacent tracks are written so as to overlap one or more previously written tracks. The shingled tracks must be written in sequence unlike conventionally separated tracks, which can be written in any order. The tracks on a disk surface are organized into a plurality of shingled regions (also called I-regions). The direction of the shingled writing for a I-region can be from an inner diameter (ID) to an outer diameter (OD) or from OD to ID. The disk may also be shingled in both directions on the same surface, with the two zones meeting approximately at the mid-diameter point. The number of tracks shingled together in a region is a key performance parameter of shingled-writing. Once written in shingled structure, an individual track cannot be updated in place, because that would overwrite and destroy the data in the overlapping tracks. Shingle-written data tracks, therefore, from the user's viewpoint are sometimes thought of like append-only logs. To improve the performance of SMR drives, a portion of the magnetic media is allocated to one or more so-called "exception regions" (E-regions) which are used as staging areas for data which will ultimately be written to an I-region. The E-region is sometimes referred to as an E-cache. Since most of the data in an SMR drive is expected to be stored sequentially in I-regions, the data records that are not currently stored in the I-regions can be thought of as "exceptions" to sequential I-region storage. When randomly ordered writes are received, they are generally stored in the disk E-region in the order received.

U.S. Pat. No. 7,965,465 to Sanvido, et al. (Jun. 21, 2011) describes techniques for using cache memory to facilitate updating the records in shingled blocks of SMR disk storage which must be sequentially written.

Address indirection in the shingle-written storage device's internal architecture is useful to shield the host from the complexities associated with SMR. Conventionally host file systems use logical block addresses (LBAs) in commands to read and write blocks of data without regard for actual locations (physical block address (PBA)) used internally by the storage device. Hard disk drives have had some level of LBA-PBA indirection for decades that, among other things, allows bad sectors on the disk to be remapped to good sectors that have been reserved for this purpose. Address indirection is typically implemented in the controller portion of the drive's architecture. The controller translates the LBAs in host commands to an internal physical address, or an intermediate address from which a physical address can ultimately be derived.

The conventional LBA-PBA mapping for defects does not need to be changed often. In contrast, in an SMR device the physical block address (PBA) of a logical block address (LBA) can change frequently. The indirection system provides a dynamic translation layer between host LBAs and the current physical locations on the media. In an SMR system, the LBA-PBA mapping can change with every write operation because the system dynamically determines the physical location on the media where the host data for an LBA will be written. The data for the same LBA will be written to a different location the next time the host LBA is updated. In addition, the drive autonomously moves data between write caches in RAM, write caches on disk, E-regions on disk and I-regions on disk. The LBAs for the data stay the same regardless of where the drive has the data stored. Background processes such as defragmentation are also executed autonomously by the device to move data sectors from one PBA to another while the LBA stays the same.

Defragmentation is a general term often used to describe a process of reorganizing records in a file or database system to eliminate or reduce the fragmentation. In SMR I-regions when records are updated or deleted the number of small free spaces, which are usually referred to as invalidated or 'stale' data, increases. The process of defragmentation physically moves the records to make them more contiguous as well as create larger, more useful free regions. DRAM is typically used in restaging because it allows efficient sorting of records into proper sequence. In SMR drives efficient defragmentation is an important factor in the overall performance of the device.

SUMMARY OF THE INVENTION

Embodiments of the invention include SMR disk drives which have a nonvolatile solid state memory E-region in addition to the magnetic media E-regions on disk. The combination of solid state memory and disk E-regions will be called hybrid E-regions. In embodiments of the invention the solid state memory E-region can be used for operations that will be referred as destaging and/or restaging. The memory E-region can be used to sequentialize sets of exception records to reduce the time and energy spent in executing seeks in the disk E-region. The ratio of the size of the solid state memory E-region to the total E-region capacity on the disks can be optimized for selected applications according to the invention using tradeoffs between performance and cost. For example, an embodiment with a memory E-region size that is 10% of the total disk E-region capacity achieves substantial performance enhancement over a disk-only E-region implementation and also results in smaller costs than would be required in a NAND-only memory E-region.

In an embodiment, a set of incoming write exceptions are first stored in the solid state memory E-region and then reordered before being destaged to a disk E-region. The use of the solid state memory E-region allows reordering to improve sequentialization and reduce the seeks required when the data records are committed to disk storage.

In another embodiment, the nonvolatile solid state memory E-region will be used for restaging data previously written to disk which needs to be reordered and then rewritten to the disk, as for example, in a defragmentation process. The destaging and restaging embodiments can also be used together.

DETAILED DESCRIPTION OF THE INVENTION

Figure 1:
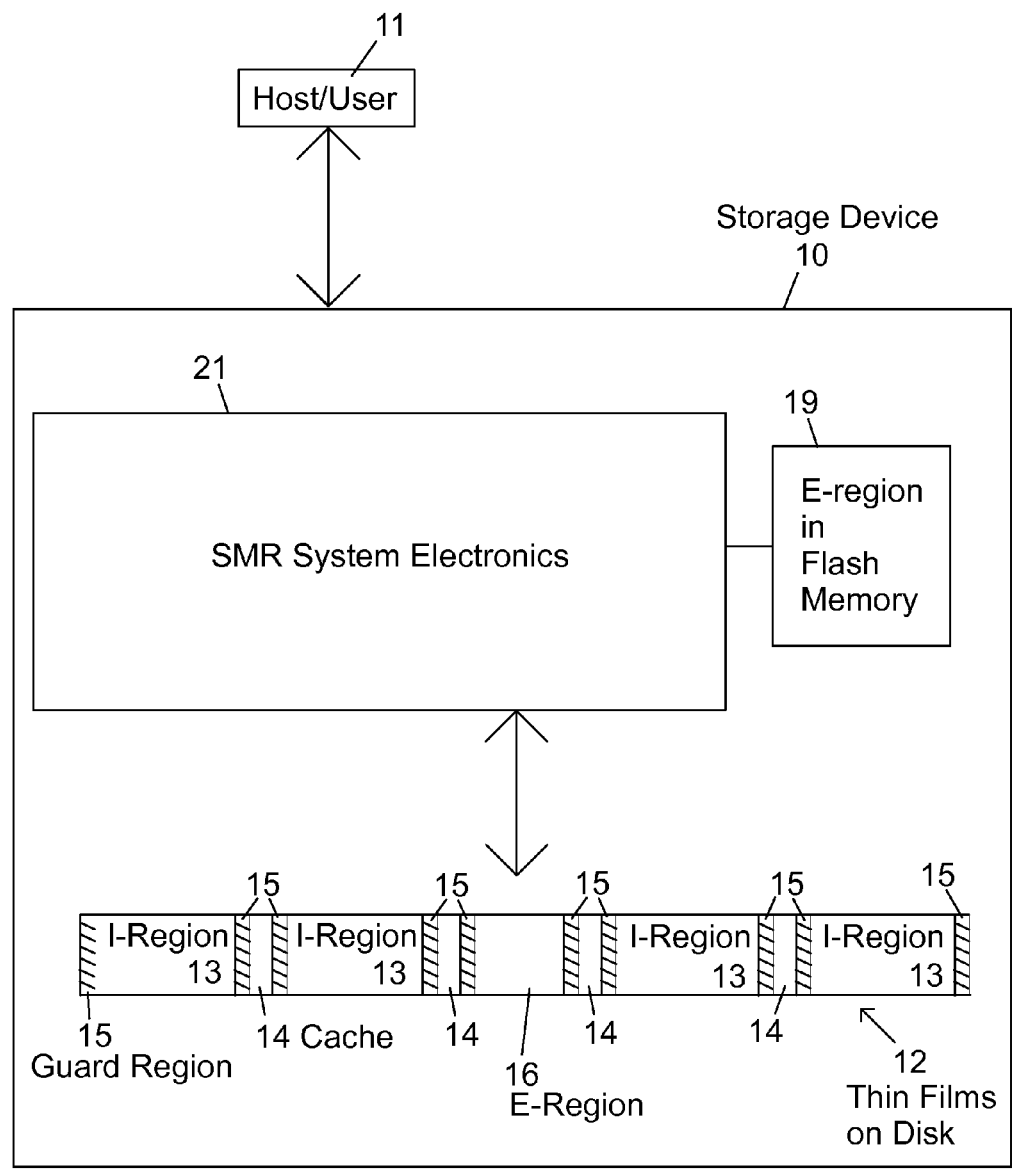
FIG. 1 is an illustration of an SMR data storage device with hybrid E-regions according to an embodiment of the invention.

FIG. 1 is an illustration of a data storage device (DSD) 10 using SMR with a system electronics unit 21 according to an embodiment of the invention. The system electronics unit 21 functions according to the prior art except as described herein, and aspects of the system that perform prior art functions are not shown. The system electronics unit 21 can be a prior art system-on-a-chip, which is an integrated circuit that includes the host interface, controller, servo functions, microprocessor, firmware programs, etc. all in a single chip.

The host/user 11 can be any type of computer and can communicate with the device by any means including through a network. The term "user" will be used interchangeably with "host." Multiple hosts can also communicate with the device using prior art techniques. Thin films 12 are magnetic thin film coatings, which typically are deposited on both upper and lower surfaces of a hard disk (not shown) and a device can also have multiple disks. The films 12 are shown in FIG. 1 in cross section view. In a plan view, the regions are a plurality of concentric circular bands. The magnetic thin films are formatted for use in an SMR architecture and in this embodiment include disk E-region 16, I-regions 13 (also called I-track regions), write cache regions 14 (also called write-twice cache regions), and guard regions or bands 15. Although only one is shown in FIG. 1, a device can have multiple E-regions 16 on each disk surface and there are usually multiple disk surfaces. Non-volatile solid state memory E-region 19 will generally be called the NAND flash E-region or NAND E-region. The NAND flash E-region 16 is used according to the invention to enhance performance and save power over a disk-only E-region implementation. In addition by designing the size of NAND E-region 16 to be substantially smaller than would be required in a NAND-only E-region, costs are saved.

A loose analogy for the problem being solved by the invention can be made to mail delivery. Incoming letters are in random order and need to be sorted into increasingly specific destinations, for example, country, region, state, zip code, mail route, delivery sequence. It would be very inefficient for a letter-carrier to drive randomly back and forth delivering mails without regard for the address.

So in this analogy the write exceptions are received in essentially random order like letters, but writing them to disk in the incoming order leads to a high number of time and resource consuming seeks later when the exceptions need to be reordered. The exceptions need to be organized in various ways before they can be written efficiently to an I-track in an I-region. A high-level pre-sorting by zip code might be compared to organizing exceptions by target I-region. Other levels of sorting the exceptions include LBA sequence. Sorting the exceptions according to the invention results in a sustained write performance that is largely independent of seek speed because the number of seeks is substantially reduced.

Other than as described herein, general destaging and restaging algorithms can be used to manage data transfers back and forth between the NAND E-region to disk E-region. In the following description the nonvolatile solid state memory used for the E-region 19 will generally be called NAND flash since this is the preferred write buffer based on current technology. However, any type of nonvolatile solid state buffer memory can be used with the invention such as phase-change memory, NOR flash, and/or MRAM. The use of the term "NAND" is for simplicity and is not meant to limit the embodiments of the invention.

Destaging Using the Hybrid E-Region

Using the NAND flash E-region 19 as a write buffer allows a set of exceptions to be generally reordered into sequence as they are destaged to the disk E-region 16. It is preferable to accumulate a large set of exception records for sorting before writing to the disk E-region. Therefore, destaging should be generally triggered when the flash E-region 19 is full to maximize the number of exceptions per I-region when destaging. This reduces the number of seeks (rereads) at when defragmentation is performed.

Figure 6:
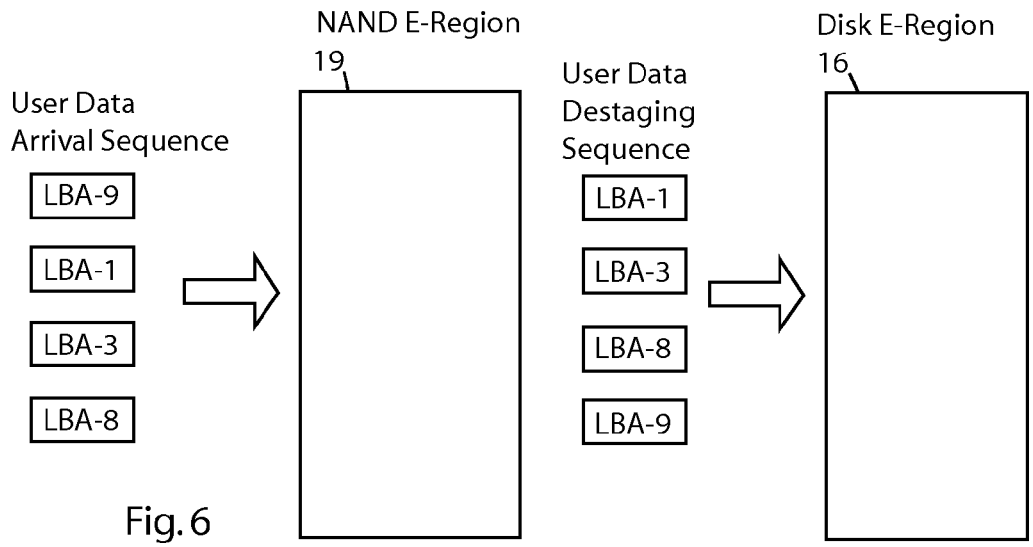
FIG. 6 is an illustration of the reordering of data blocks during destaging from NAND flash E-region to disk E-region according to an embodiment of the invention.

FIG. 6 is an illustration of the reordering of exception data blocks during destaging from NAND flash E-region 19 to disk E-region 16 according to an embodiment of the invention. Over time the host can send write records in sequential, reverse-sequential, some other non-random order or essentially random order. The invention provides the biggest gain over the prior art when the records are received in random order. In the example of FIG. 6, the LBA blocks on the left are assumed to be received from the host/user in essentially random order and placed in NAND flash E-region. Although the exception records can be sorted into sequence in the NAND flash E-region, the physical order that the exception LBA blocks have inside the flash E-region is not critical because no mechanical, time-consuming seeks are required to move from entry to entry. The important point is that the set of LBA blocks are destaged to the disk E-region in an improved sequential order. This means that the disk E-region 16 does not contain the raw random writes as in SMR prior art. The initial reordering of a set of host random writes (exception records) increases the effective reread rate of individual exceptions. The number of seeks is reduced, but this is somewhat independent of the reread rate.

These "skip-sequentials" are burst-read upon restaging/defragmentation. The invention allows for a substantial reduction in the number of random seeks during the defragmentation process for the disk E-region 16. The reordering of the set of exception records before or as they are written to the disk E-region 16 is accomplished by the system electronics and can be achieved by firmware programs executed by a microprocessor.

Because more random rereads are needed in a disk-only E-region design, it suffers from: a) Poor short-seek mechanics; b) Higher Sort overhead; c) Insufficient SRAM for large internal queues; and d) Higher power consumption. In contrast, the invention results in fewer random seeks when rereading during restage/defragmentation and therefore, improves on each of the problems given above with the disk-only E-region design including allowing significant power savings. Although DRAM can be used in the place of NAND flash, there are benefits to using NAND rather than DRAM. NAND is about 10× cheaper per MB than DRAM, and NAND is nonvolatile unlike DRAM.

The hybrid E-region design is also less expensive than 100% replacement of disk E-regions with a NAND flash E-region. The invention allows the NAND E-region size to be substantially less than the total disk E-region size. For example, as the data below show, using a NAND E-region size that is about 10% of the total disk E-region storage size achieves improved performance. Using a 10% NAND E-region size also lowers the incremental cost to 10% of a NAND-only E-region design. Performance estimates (see Table 1) show that a system with 2 GB of NAND used for destaging in a hybrid E-region design can achieve 498 IOPs, which is comparable performance to a system with 32 GB of NAND-only E-region (421 IOPs). The estimates in Table 1 assume 2 TB user capacity and 4 k RW IOPs. IOPs stands for Input/Output Operations Per Second.

TABLE 1

| NAND Capacity (GB) | % Over Provisioning | NAND E-Region IOPs | NAND destage IOPs |
|---|---|---|---|
| 2 | 0.11% | 30 | 498 |
| 4 | 0.21% | 59 | 568 |
| 8 | 0.43% | 116 | 626 |
| 32 | 1.72% | 421 | 783 |
| 64 | 3.44% | 747 | 954 |

Current perpendicular magnetic recording (PMR) drive technology places random writes in random locations, requiring more seeks before each write and thus more latency. SMR drives with hybrid E-regions have faster random write IOPs because no random seeks are needed during user data writes. New user data is either written sequentially to an I-track in an I-region or to a disk E-region in SMR drive.

Figure 2:
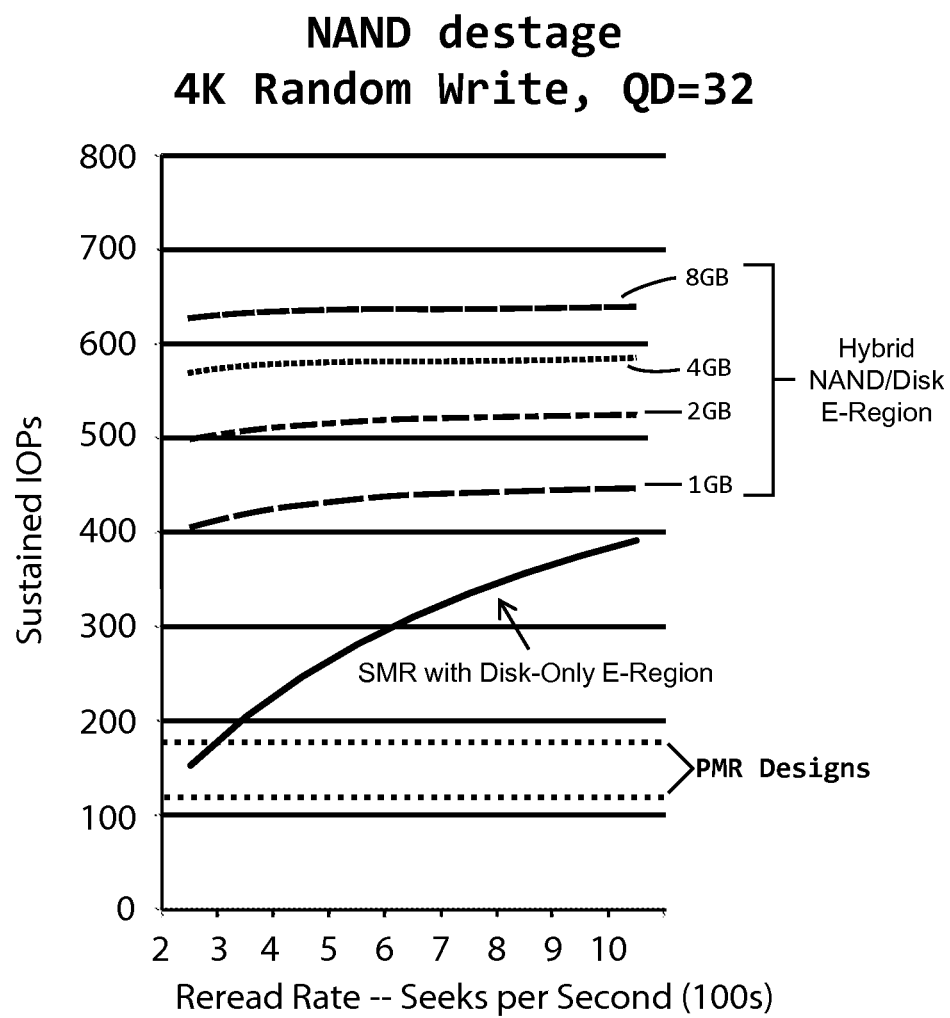
FIG. 2 is a graph showing sustained IOPs on the vertical axis v. the reread rate (seeks per second) on the horizontal axis for an SMR drive with a disk-only E-region, and for 4 drives according to embodiment of the invention with hybrid E-regions with NAND flash sizes 1 GB, 2 GB, 4 GB and 8 GB.

FIG. 2 is a graph showing sustained IOPs on the vertical axis v. the reread rate (seeks per second) on the horizontal axis for an SMR drive with a disk-only E-region, and for 4 drives with hybrid E-regions with NAND flash sizes 1 GB, 2 GB, 4 GB and 8 GB. Each of the 4 hybrid E-region examples results in higher IOPs than the disk-only E-region across the reread rate range of 200 to 1000 seeks per second. Although larger NAND flash size results in better performance, each doubling of flash size yields less increase than the one before.

Sequentialization of exceptions according to the invention almost completely removes the effect of seek speed from sustained write performance. NAND E-region destage ("NED") achieves equivalent performance to NAND only E-region design and uses 80%-90% less NAND. While the same performance benefit is possible using an equivalently sized DRAM E-region buffer instead of NAND, the NAND E-region has advantages over DRAM.

Figure 3:
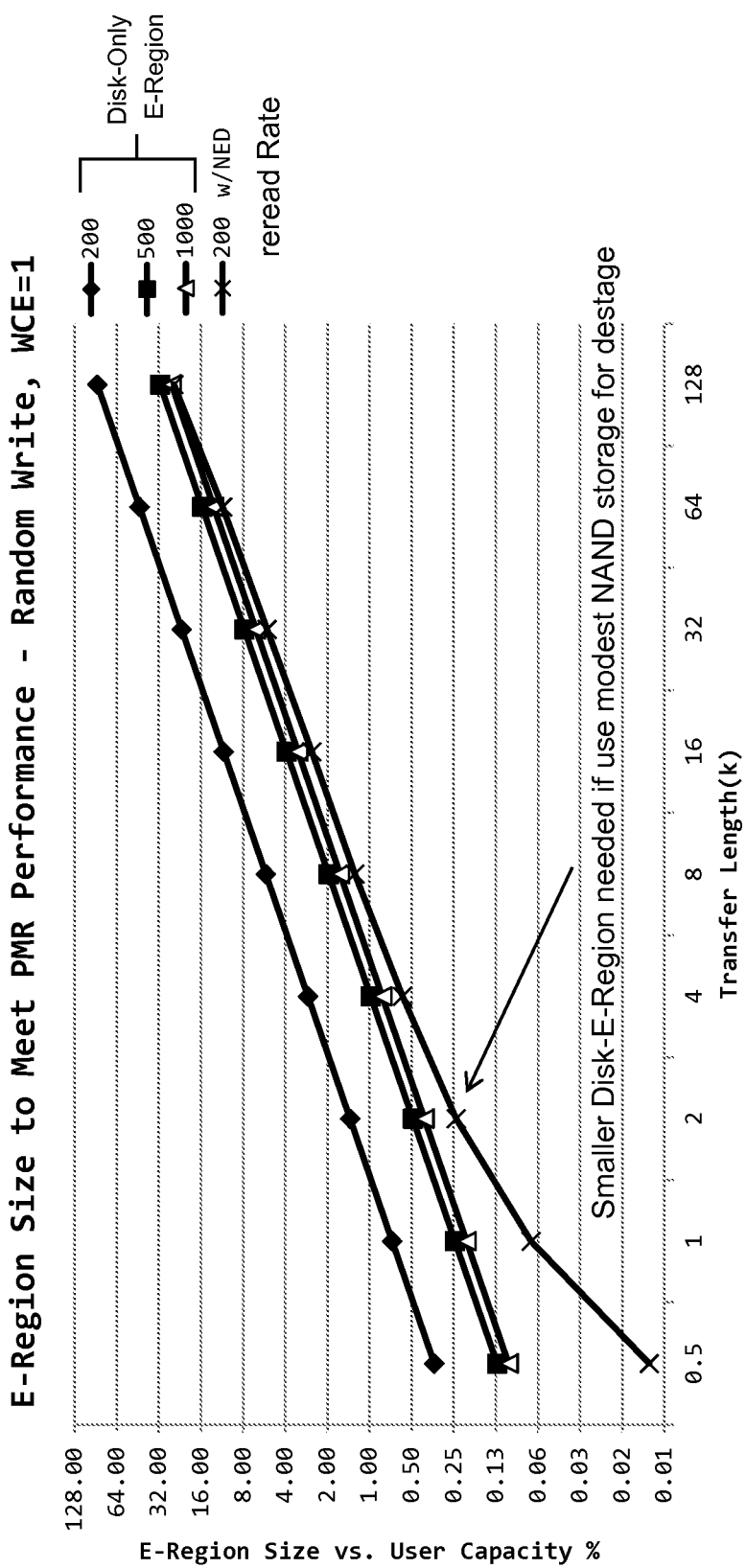
FIG. 3 is a graph showing the E-region size required to match PMR performance using disk-only E-Region and using NAND hybrid E-region for destaging according to the invention.

The graph in FIG. 3 compares long transfer block size performance using disk-only E-Region to using NAND hybrid E-region for destaging according to the invention. The horizontal axis is transfer length in 1 k units. The estimates assume PMR performance level, command Queue Depth (QD)=32, and Write Cache Enabled (WCE)=1, i.e. WCE On. The vertical axis is the ratio in percent of disk E-region size over user capacity. If the size of the disk E-region is allowed to expand, reread rate has a strong influence on the amount of E-region space required to meet the PMR equivalent performance level. E-region expansion allows rereading to remain dominant. For a given exception reread rate, the E-region size requirement doubles for every doubling of transfer length. This keeps the average number of exceptions per track constant.

The upper 3 lines on the graph are for reread rates of 200, 500 and 1000 seeks per second for disk-only E-region. The lower line is for the hybrid E-region according to the invention. At 1 k transfer length and reread rate of 200, with the above assumptions, the invention allows a disk E-region size that is about 10% of the size of a disk-only E-region needed to match the PMR performance. The advantage of the hybrid E-region declines as transfer length increases, but is never worse than a disk-only E-region. For drives that have or desire low reread rates, NAND destage ("NED") can be used to reduce disk E-region requirements which allows more of the drive's capacity to be allocated to I-regions for user data storage. (Note: Lower reread rates in one drive versus another can result from design tradeoffs, for example, to save space, minimize power on the seek, or lower cost. An example would be the choice of smaller, less powerful voice coils, which are responsible for moving the actuator.)

Restaging Using the Hybrid E-Region

Figure 7:
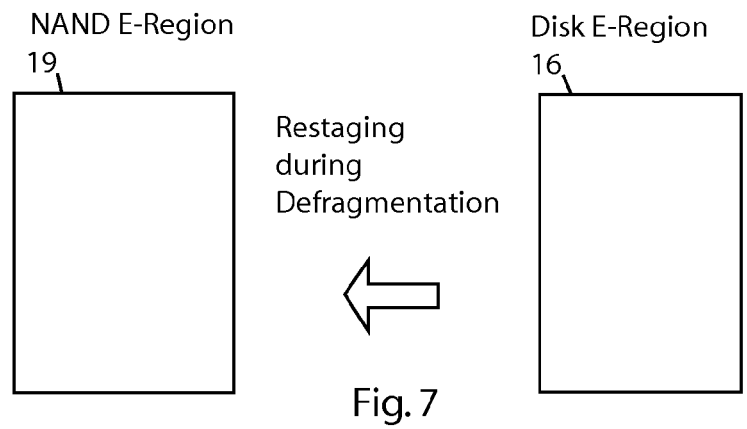
FIG. 7 is an illustration of the use the NAND flash E-region in restaging data blocks from a disk E-region to facilitate reordering of data blocks during defragmentation of a disk E-region according to an embodiment of the invention.
Figure 8:
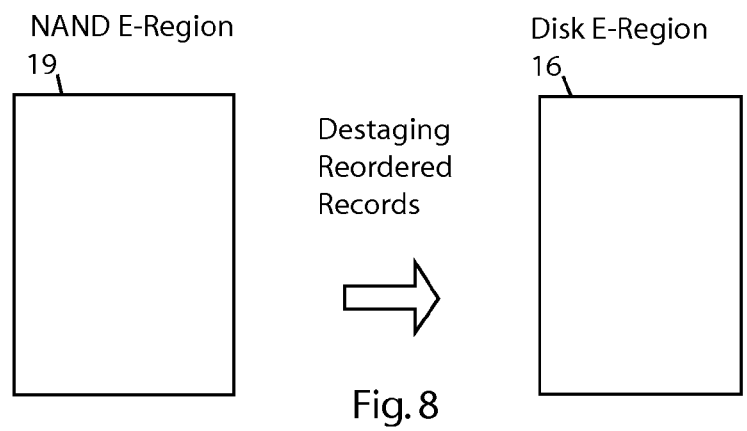
FIG. 8 is an illustration of the destaging from the NAND flash E-region of the reordered data blocks back to the disk E-region during defragmentation of a disk E-region according to an embodiment of the invention.

The NAND flash E-region 19 can also be used for the restaging (e.g. I-region or disk E-region defragmentation), as well as the initial reordering (sequentialization) before destaging as described above. FIG. 7 is an illustration of the use the NAND flash E-region 19 in restaging data blocks from a disk E-region 16 to facilitate reordering of data blocks during defragmentation of a disk E-region according to an embodiment of the invention. FIG. 8 is an illustration of the destaging from the NAND flash E-region of the reordered data blocks back to the disk E-region during defragmentation of a disk E-region according to an embodiment of the invention. The restaging can be accomplished by the system electronics with firmware programs executed by a microprocessor. When defragmenting the disk E-region, the use of the flash E-region allows the records to be read from the disk E-region in the physical order that they appear to minimize the seeking time. Once the records are in flash E-region they can easily be sorted using any selected criterion such as LBA sequence.

The benefits of restaging using the NAND E-region include:
  Reducing DRAM requirements (DRAM 10× more expensive than NAND flash), for example to 16 MB to 64 MB of DRAM. DRAM buffer size plays a large role in the disk-E-Region size requirements.
  Restaging is an additional opportunity to reorder exceptions prior to I-track rewriting.

Figure 4:
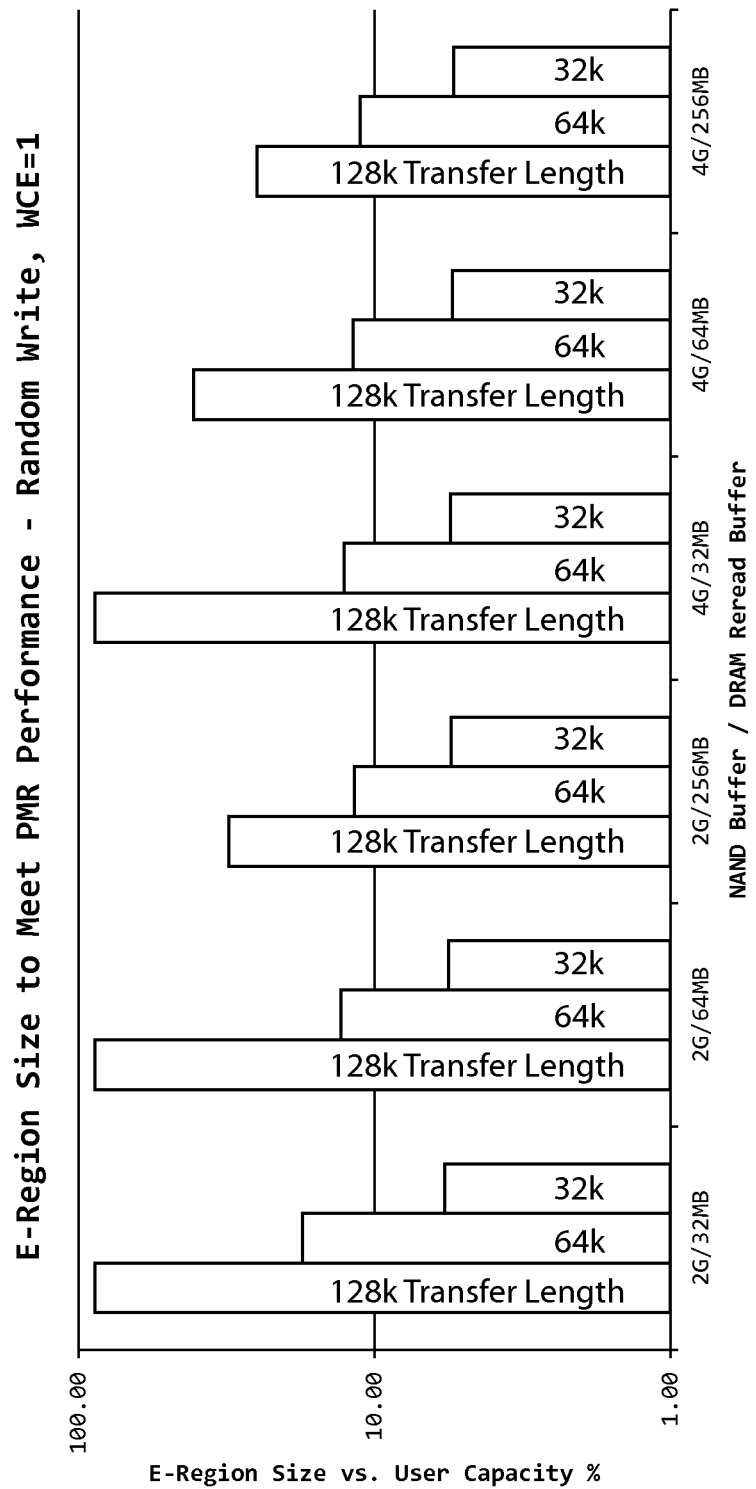
FIG. 4 is a bar graph showing the ratio in percent of disk E-region size over user capacity for devices with various NAND E-region sizes and DRAM reread buffer sizes and transfer lengths.

The bars in the graph in FIG. 4 show the ratio in percent of disk E-region size over user capacity for devices with various parameters. Each set of 3 bars corresponds to the selected NAND E-region and DRAM reread buffer sizes shown below the bars. For example, the first set of bars on the left is for NAND=2 GB and DRAM=32 MB. In each set of bars, from left to right, the bars correspond to 128 k, 64 k and 32 k transfer lengths. The results show that DRAM buffer size plays a large role in the disk E-region size requirements. Therefore, it may be beneficial to rewrite exceptions into the NAND E-region just prior to defragmentation. For example, a smaller DRAM can be included in the design by using the NAND E-region instead of DRAM for restaging.

In cases where the disk E-region is much larger than the NAND available for destaging, it may be beneficial to store exceptions back into the NAND just prior to defragmentation with restaging into NAND. Merging with the I-track would still occur with extensive use of DRAM. For example, if E-region is 10× the size of the NAND destage buffer, then on average 10 seeks will be required to recover all exceptions from disk E-region for an I-track prior to defragmentation. Multiple I-tracks of exceptions should be reread for each seek, increasing buffer requirements and reducing the per I-track reread cost.

Figure 5:
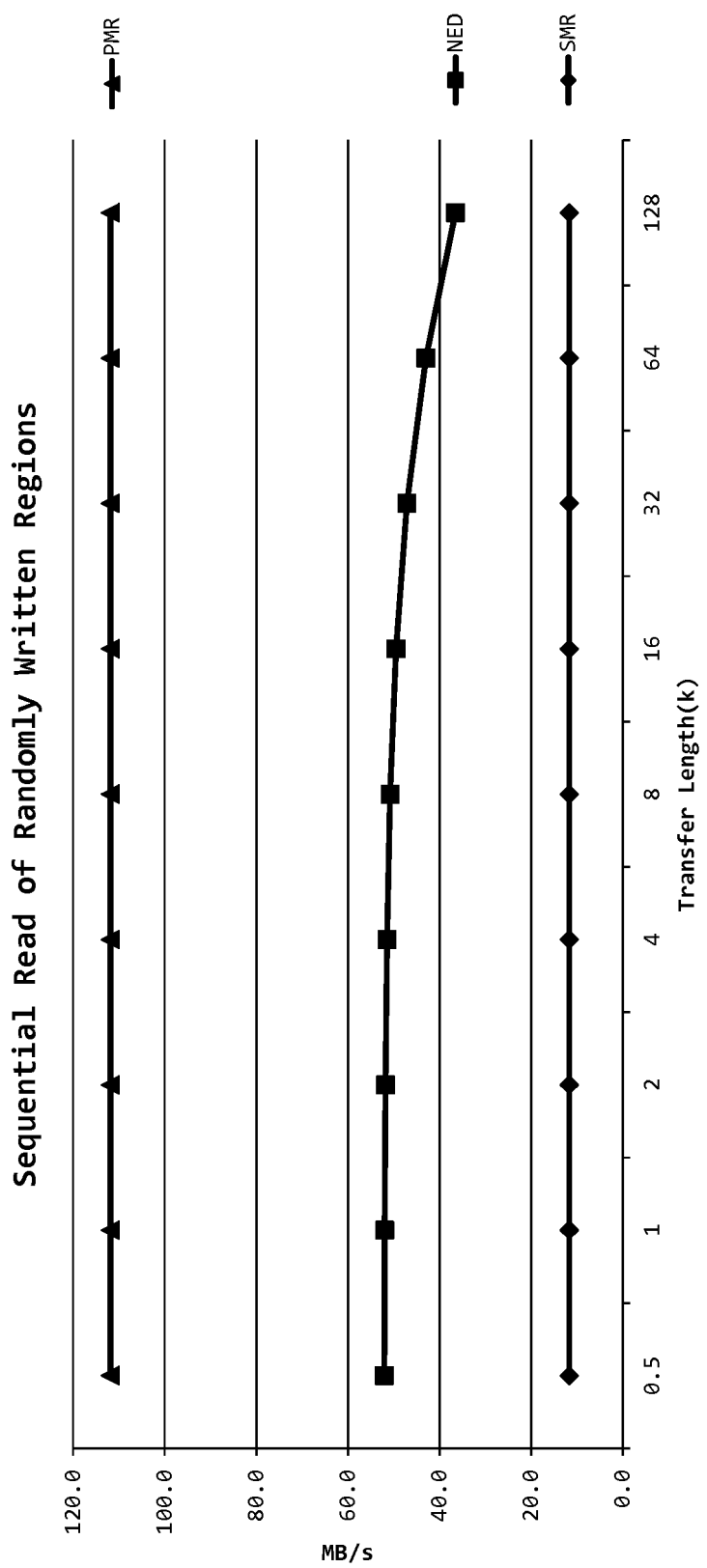
FIG. 5 is a graph showing sequential read performance in MB/sec for randomly written regions for a conventional PMR drive, a disk-only E-region SMR drive and a hybrid E-region drive according to the invention.

The graph in FIG. 5 shows sequential read performance in MB/sec for randomly written regions for a conventional PMR drive, a disk-only E-region SMR drive and a hybrid E-region drive according to the invention. The horizontal axis shows the transfer length. The results show that NAND E-region destaging according to the invention reduces the number of random reads required to satisfy sequential reads in host regions containing randomly written data in comparison to a disk-only E-region SMR drive.

Alternative Embodiments & Optional Features

Several optional features or optimizations that can be included in various embodiments of the invention will now be discussed. One option is to locate the disk E-region 16 near the OD of the disk to use the higher bits per revolution that hard drives have at the OD. The tracks near the OD are longer and hold about 2× the data per revolution at the ID on typical disks.

Another option is to select the total disk E-region storage as approximately 3% of total disk storage, e.g. 30 GB in a 1 TB SMR drive. Because disk E-region tracks come at the expense of I-region tracks, it is a benefit of the invention that the disk E-region size can be lower than it would otherwise be. There are diminishing incremental benefits to larger E-region capacity if larger NAND storage capacity is used. (See FIG. 2).

As suggested above, selecting the total NAND E-region storage to be approximately 10% of the total disk E-region storage or 0.3% of total disk storage, is an attractive option in achieving substantial performance improvement at a reasonable cost. If the total disk E-region storage is selected as approximately 3% of total disk storage and the NAND E-region is 10% of that, then the NAND E-region is 0.3% of total disk storage.

Another option to consider is that DRAM can be used for buffering of incoming write operations before writing to either NAND and/or disk; DRAM and SRAM used by hard disk controller to help reorder and move user data.

The invention claimed is:

1. A shingled-magnetic recording disk drive comprising:
a disk with magnetic thin film coating with data stored in a plurality of circular tracks;
an I-region that includes a first subset of tracks which are shingle-written sequentially with tracks partially overlapping previous tracks;
a disk E-region that includes a second subset of tracks which hold exception records, which are records received in write commands in a non-sequential order;
a memory E-region that includes exception records stored in a nonvolatile solid state memory; and
system electronics which restages a set of exception records from the disk E-region to the memory E-region in a first sequence order as read from the disk E-region and then writes the set of exception records to the disk E-region in a second sorted sequence order that is different from the first sequence order.

2. The disk drive of claim 1 further comprising a plurality of disk E-regions having a total disk E-region storage size and wherein a size of the memory E-region is substantially smaller than the total disk E-region storage size.

3. The disk drive of claim 2 wherein the size of the memory E-region is approximately 10% of the total disk E-region storage size.

4. The disk drive of claim 2 wherein the second sorted sequence order results in less seeking time being required to write the set of exception records than would be required to write set of exception records in an I-region in the first sequence order.

5. The disk drive of claim 1 wherein the second sorted sequence order results in less seeking time being required to write the set of exception records to an I-region than would be required to write the set of exception records in the first sequence order.

6. The disk drive of claim 1 wherein the system electronics stores a second set of exception records as received in write commands in a received sequence order in the memory E-region and then writes the second set of exception records to the disk E-region in a sorted third sequence order that is different from the received sequence order.

7. A method of operating a shingled-magnetic recording disk drive, which stores records received in a non-sequential order in write commands as exception records, comprising:
reading a set of exception records from a disk E-region into a memory E region which is in a nonvolatile solid state memory, the set of exception records being read in a first sequence order corresponding to a physical order in the disk E-region; and
writing the set of exception records to the disk E-region in a second sorted sequence order that is different from the first sequence order, the second sorted sequence order being a sorted order for a selected characteristic of the set of exception records.

8. The method of operating a disk drive of claim 7 wherein the disk drive further comprises a plurality of disk E-regions having a total disk E region storage size and wherein a size of the memory E-region is substantially smaller than the total disk E-region storage size.

9. The method disk drive of claim 8 wherein the size of the memory E-region is approximately 10% of the total disk E-region storage size.

10. The method of claim 9 wherein the second sorted sequence order results in less seeking time being required to write the set of exception records to an I-region than would be required to write the set of exception records in the first sequence order.

11. The method of claim 7 further comprising sorting the set of exception records into the second sorted sequence order in the memory E region before writing the set of exception records to the disk E-region in the second sorted sequence order.

12. The method of claim 7 further comprising storing a second set of exception records in the memory E-region, the second set of exception records being received in write commands in a random order; and writing the second set of exception records to the disk E-region in a third sequence order that is different from the random order, the third sequence order being a sorted order for a selected characteristic of the second set of exception records.

13. The method of claim 12 wherein the second sorted sequence order results in less seeking time being required to write the set of exception records to an I-region than would be required to write the set of exception records in the first sequence order.

* * * * *